US006644697B1

(12) United States Patent
Schinella

(10) Patent No.: US 6,644,697 B1
(45) Date of Patent: Nov. 11, 2003

(54) INTEGRATED SHOPPING LIST AND COUPON FOLDER

(76) Inventor: Adriane Maria Schinella, 151 Longview Dr., Catonsville, MD (US) 21228

(*) Notice: Subject to any disclaimer, the term of this patent is extended or adjusted under 35 U.S.C. 154(b) by 0 days.

(21) Appl. No.: 10/212,653

(22) Filed: Aug. 5, 2002

(51) Int. Cl.[7] .......................... B43D 15/00; G09B 19/00

(52) U.S. Cl. .......................... 283/116; 283/51; 283/61; 283/115; 281/29; 281/31; 281/37; 281/45; 281/DIG. 1; 229/72; 229/74; 229/75; 229/92.8; 402/79; 402/503; 40/124.09; 40/124.11; 40/359; 40/630; 40/638; 40/654.01; 40/594; 40/775; 40/776; 40/661.06; 40/661.08; 40/661.09

(58) Field of Search .......................... 283/116, 51, 115, 283/61; 229/92.8, 74, 75, 72; 281/DIG. 1, 45, 29, 31, 37; 402/503, 79; 40/630, 638, 654.01, 594, 775, 776, 359, 124.09, 124.11, 661.06, 661.09, 661.08

(56) References Cited

U.S. PATENT DOCUMENTS

| | | | | | |
|---|---|---|---|---|---|
| 489,060 | A | | 1/1893 | Wilhelm | |
| 1,729,916 | A | | 10/1929 | Vernon | |
| 2,279,189 | A | | 4/1942 | Uhlir | |
| 3,593,913 | A | * | 7/1971 | Bremer | 229/68.1 |
| 4,580,360 | A | * | 4/1986 | Gribb | 40/638 |
| 4,643,451 | A | | 2/1987 | Coates | |
| 4,765,485 | A | * | 8/1988 | Perkins | 229/315 |
| 4,795,196 | A | | 1/1989 | Hyun et al. | |
| 4,954,003 | A | | 9/1990 | Shea | |
| 5,004,270 | A | | 4/1991 | Schaul et al. | |
| 5,060,793 | A | | 10/1991 | Hyun et al. | |
| 5,318,324 | A | * | 6/1994 | Lombardo et al. | 156/250 |
| 5,350,197 | A | | 9/1994 | Schmidt | |
| 5,788,073 | A | * | 8/1998 | Suryk | 206/425 |
| 6,241,286 | B1 | * | 6/2001 | Ogura et al. | 281/29 |
| 2002/0135178 | A1 | * | 9/2002 | Rzadzki | 281/45 |

* cited by examiner

*Primary Examiner*—A. L. Wellington
*Assistant Examiner*—Mark T. Henderson
(74) *Attorney, Agent, or Firm*—John A. Galbreath

(57) ABSTRACT

The invention is an integrated shopping list and coupon folder, formed from a single shopping list sheet. Major food and non-food category listings are provided on the shopping list sheet, as well as blank lines for listing individual items, sizes, brands, and the like. Coupon reminders are also located proximate to each blank line. A bottom tacky strip is located across the bottom edge of the shopping list sheet, and two side tacky strips are located at opposing side edges of shopping list sheet. To convert the shopping list sheet into an integrated shopping list and coupon folder, the completed shopping list sheet is peeled from a pad of such sheets and folded along a central fold line, such that the bottom tacky strip seals against itself and the side tacky strips seal against each other. The integrated shopping list and coupon folder is thus formed.

20 Claims, 6 Drawing Sheets

INTEGRATED SHOPPING LIST AND COUPON FOLDER

This invention is in the area of shopping aids, specifically an integrated shopping list and coupon folder comprising a shopping list sheet that is folded vertically when complete, to form a coupon folder in which coupons can be placed for use during the shopping trip. The shopping list sheet, or a pad of such sheets, can be conveniently placed on a counter or refrigerator door.

DESCRIPTION OF THE RELATED ART

Various preprinted shopping lists and coupon pouches are disclosed in the prior art; however, these devices exhibit significant disadvantages and use limitations. For example, U.S. Pat. No. 5,350,197 to Schmidt shows a shopping list sheet with a folded pouch at the bottom, open on two sides, for containing coupons. However, the coupon pouch in Schmidt is pre-formed using permanent adhesive, not formed from a single flat sheet by the user after completing the shopping list. As such, Schmidt's device cannot easily be bound into a convenient, compact pad of sheets from which each shopping list can be peeled upon completion. In addition, Schmidt's device does not disclose the discrete areas of resealable tacky adhesive that enable the invention to be converted quickly and easily from a flat shopping list sheet into an integrated shopping list and coupon folder. Further, since Schmidt's coupon pouch is not formed from the entire shopping list sheet, its overall capacity—particularly, its ability to hold larger coupons from a variety of different sources—is much less than the coupon folder of the invention.

In addition, U.S. Pat. No. 5,004,270 to Schaul et al. discloses a coupon pouch attached to a printed display of grocery items; however, Schaul's device contains no shopping list that a user can fill out. Similarly, U.S. Pat. No. 4,643,451 to Coates; and U.S. Pat. Nos. 4,795,196 and 5,060793, both to Hyun et al., show coupon organizers constructed of folded paper or cardboard, but these patents do not feature a shopping list.

U.S. Pat. No. 489,060 to Wilhelm; U.S. Pat. No. 1,729,916 to Vernon; and U.S. Pat No. 2,279,189 to Uhlir disclose various types of shopping lists, but none of these devices include a coupon pouch. U.S. Pat. No. 4,954,003 to Shea shows a coupon organizer with the ability to contain a shopping list, but Shea's device is not formed from a folded sheet of paper. Rather, it comprises a ring binder with several permanent, clear plastic holding pockets, and the shopping list is merely a loose-leaf page in the binder. Shea's device is large and unwieldy, and difficult for a user to carry along on a shopping trip.

Thus it can be seen that a shopping list sheet having discrete areas of resealable tacky adhesive, which can be bound together into a compact pad of sheets, and which can be quickly and easily folded down the center to form an integrated shopping list and coupon folder, would be a clear and significant improvement over the prior art.

Accordingly, several objects and advantages of the invention are:

It's a convenient, multi-purpose device. A plurality of shopping list sheets can be bound into a compact pad of sheets, from which a single sheet is peeled upon completion of the shopping list. This single sheet is then quickly and easily converted into a integrated shopping list and coupon folder using the discrete areas of resealable tacky adhesive.

The completed coupon holder with integrated shopping list is compact, lightweight, and easily stowable in a purse or pocket.

The invention provides a low-cost, disposable solution, vs. other prior art which is composed of multiple parts and is needlessly complex.

The magnetic strip located on the back of the pad of sheets enables the pad to be conveniently placed on any magnetically attractable surface, such as a refrigerator or cabinet door. Alternatively, the pad can simply be placed on a counter.

Further objects and advantages of the invention will become apparent from a consideration of the drawings and ensuing description.

SUMMARY

The invention is an integrated shopping list and coupon folder, comprising a single sheet or pad of sheets that can be conveniently placed on a counter or refrigerator door. When the shopping list is complete, the single sheet, or a single sheet peeled from the pad, is folded vertically to form an integrated shopping list and coupon folder in which coupons can be placed for use during the shopping trip.

Figure 1:
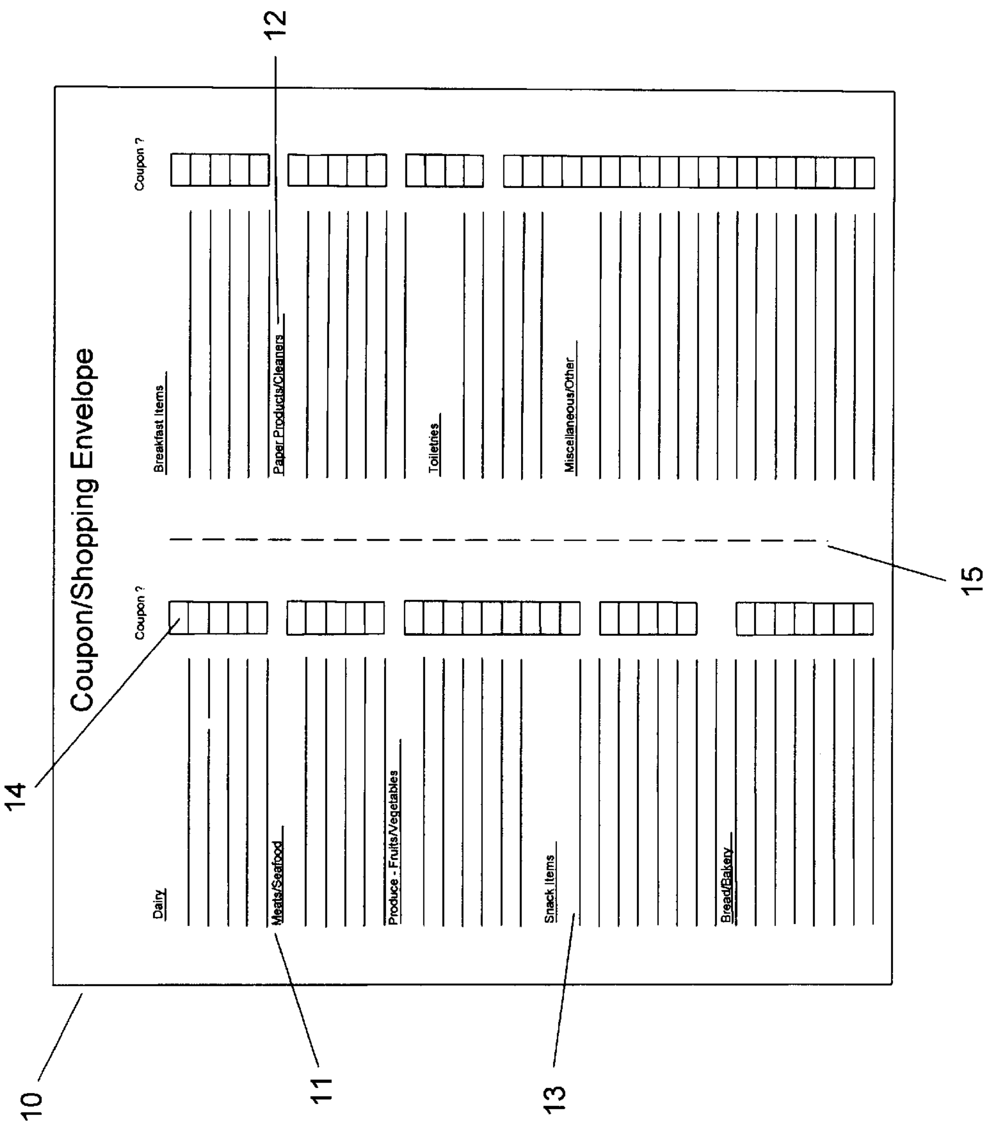
FIG. 1 is a front view of the shopping list sheet, before conversion into an integrated shopping list and coupon folder.

DETAILED DESCRIPTION OF THE INVENTION:

The following provides a list of the reference characters used in the drawings:

| | |
|---|---|
| 10. | Shopping list sheet |
| 11. | Food category |
| 12. | Non-food category |
| 13. | Blank line |
| 14. | Coupon reminder |
| 15. | Fold line |
| 16. | Integrated shopping list and coupon folder |
| 17. | Bottom tacky strip |
| 18a & b. | Side tacky strips |
| 19. | Pad |
| 20. | Binding |
| 21. | Backing sheet |
| 22. | Magnetic strip |

FIG. 1 illustrates a single shopping list sheet 10, before conversion into a coupon folder. Major food categories 11 and non-food categories 12 are included, under which are located blank lines 13 where the user can list individual items, sizes, brands, and the like. Coupon reminders 14, in the form of check boxes, are also located proximate to each blank line 13, in order to remind the user which coupons are contained inside and which individual items they relate to. A fold line 15 is disposed substantially down the center of the lengthwise dimension of shopping list sheet 10, in order to provide a visual guide for correctly folding shopping list sheet 10 to form the integrated shopping list and coupon folder 16 shown in FIG. 3.

Figure 2:
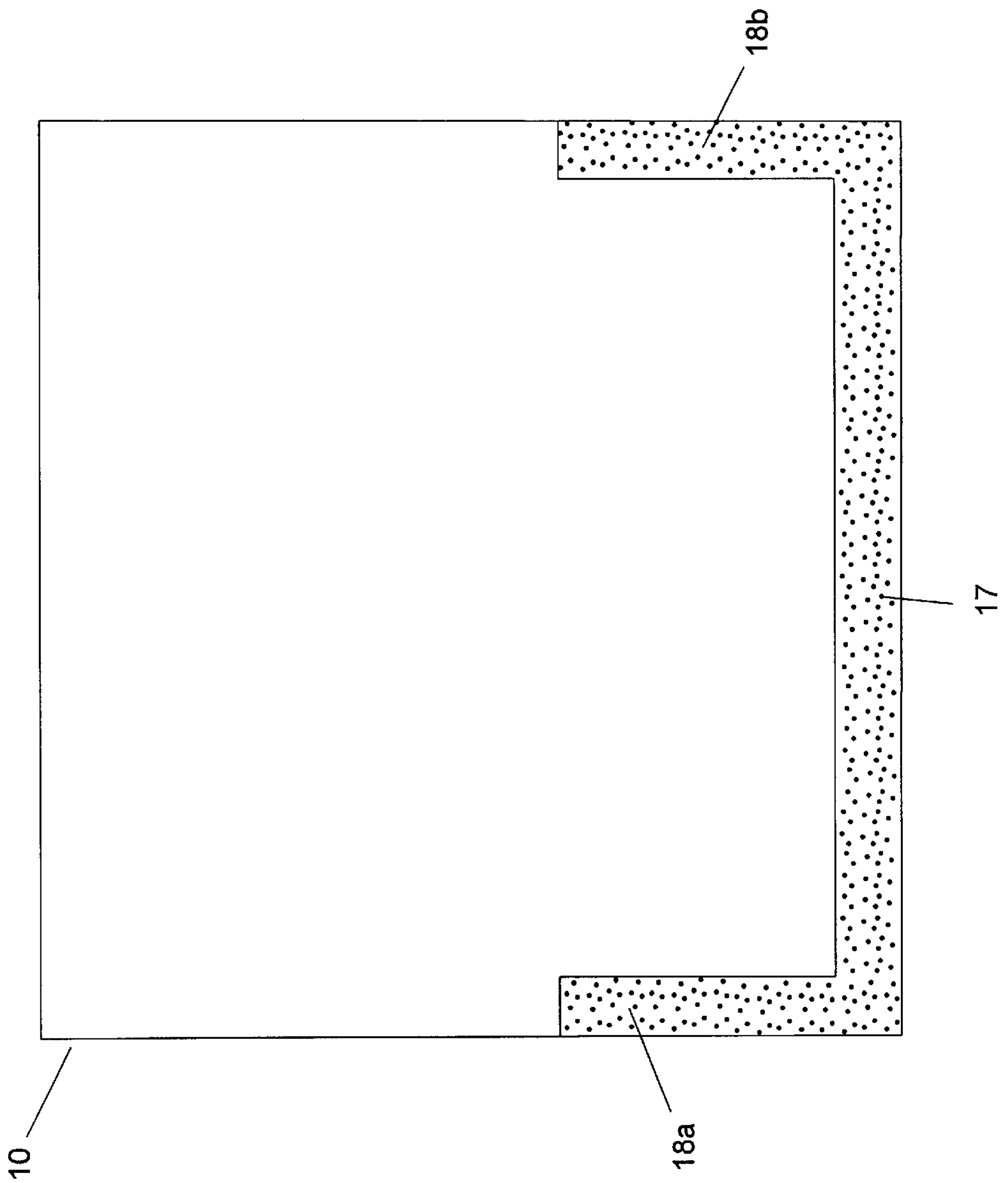
FIG. 2 is a back view of the shopping list sheet, illustrating the areas of tacky adhesive which serve to hold the edges of the coupon folder together.

FIG. 2 is a back view of shopping list sheet 10. A bottom tacky strip 17 is located across the bottom edge of shopping list sheet 10, and two side tacky strips 18*a&b* are located at opposing side edges of shopping list sheet 10 and extend partially up the sides thereof.

Figure 3:
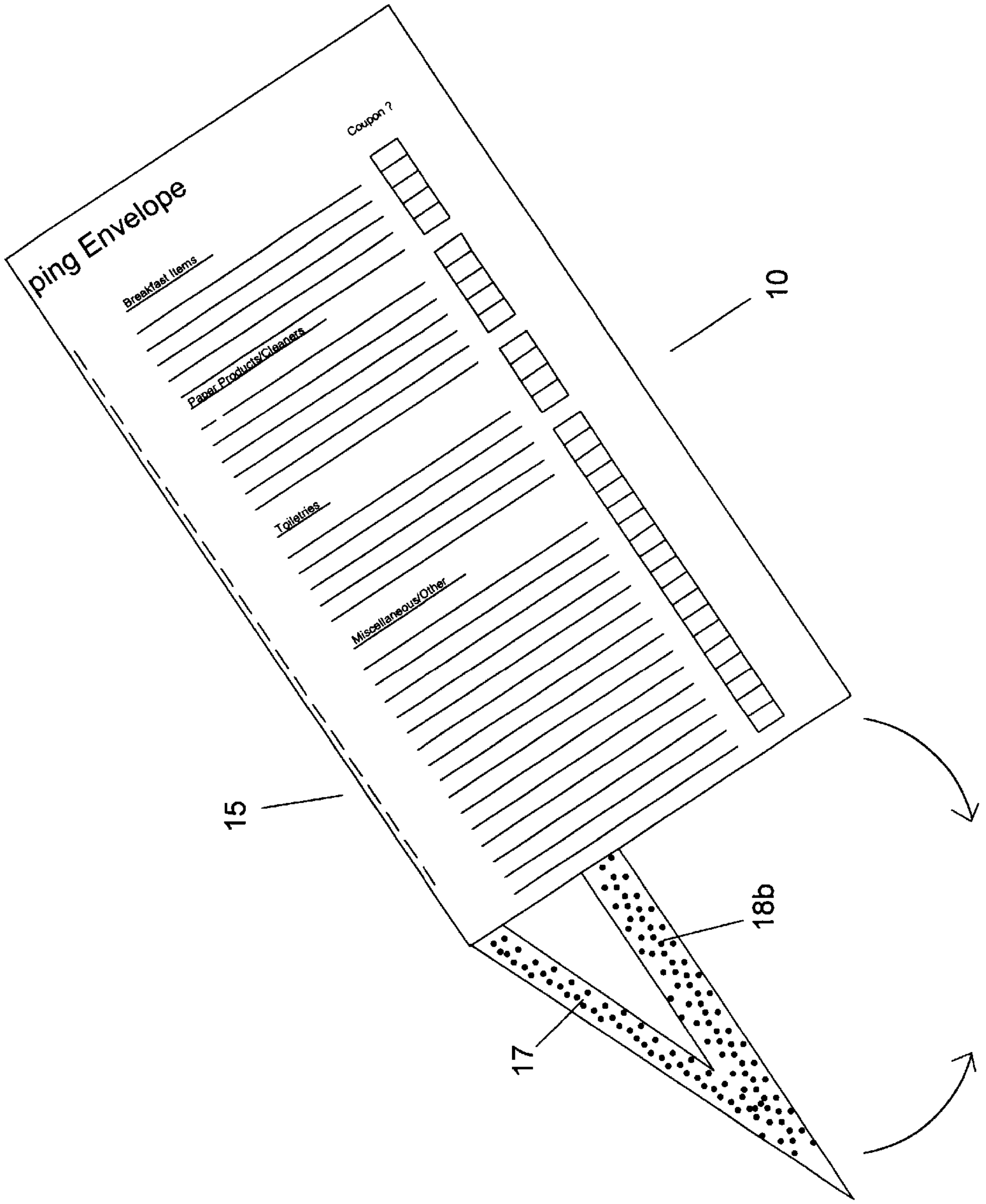
FIG. 3 illustrates the invention during conversion from a flat shopping list sheet into a coupon folder, accomplished by folding the shopping list sheet along a longitudinal fold line and bringing together the tacky edges.
Figure 4:
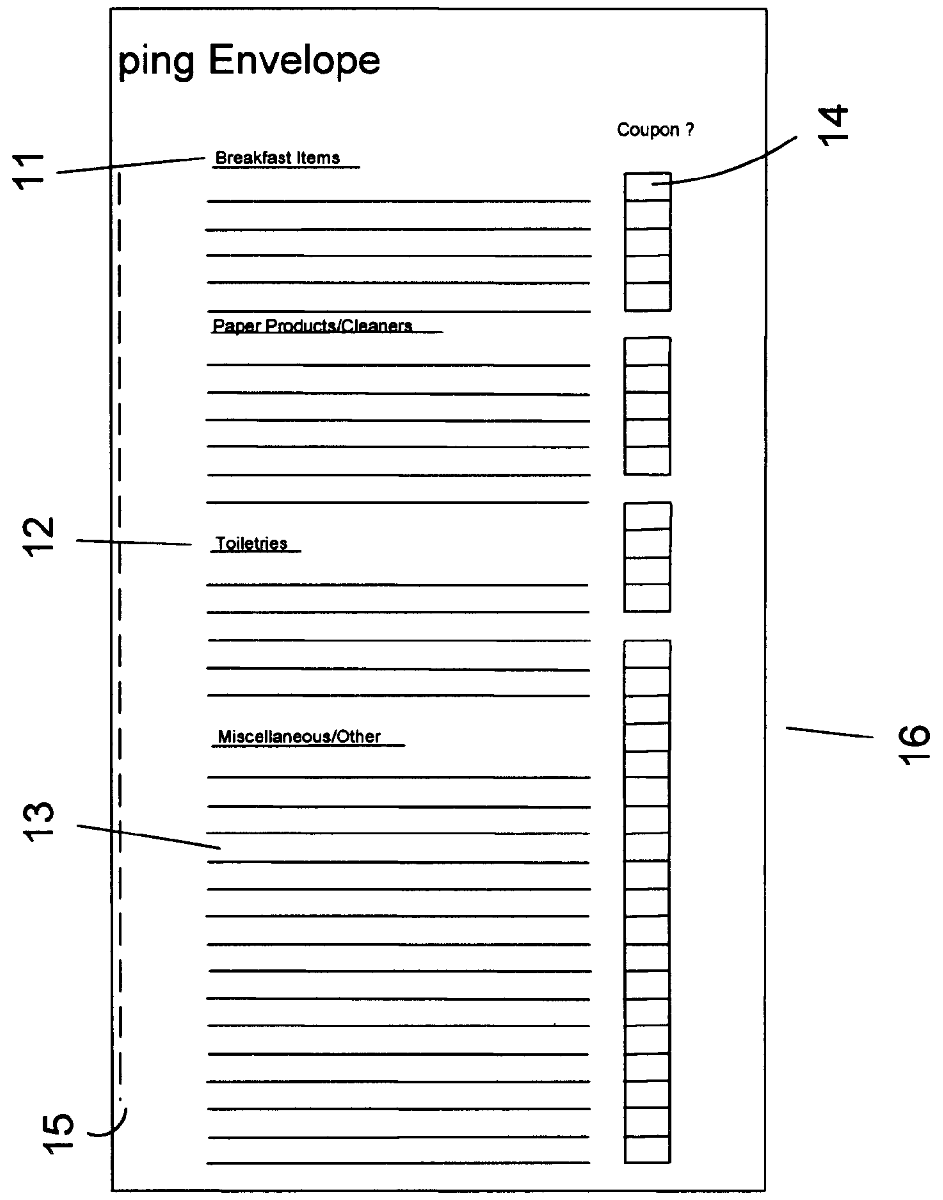
FIG. 4 shows the completed integrated shopping list and coupon folder.

FIG. 3 illustrates the invention during conversion from a flat shopping list sheet into an integrated shopping list and coupon folder. Shopping list sheet 10 is folded along fold line 15, such that bottom tacky strip 17 seals against itself and side tacky strips 18*a&b* are brought into proximity with each other and seal against each other. An integrated shopping list and coupon folder 16 is thus formed, as further illustrated in FIG. 4. Integrated shopping list and coupon folder 16 is fully closed on two sides by fold line 15 and bottom tacky strip 17, and is also partially closed on a third side by side tacky strips 18*a&b*. Coupons of various sizes and shapes may be enclosed in integrated shopping list and coupon folder 16 and conveniently accessed without the risk of coupons falling out. In addition, as also illustrated in FIG. 4, the shopping list remains fully visible on the outside surfaces of integrated shopping list and coupon folder 16, for reference during the shopping trip.

Figure 5:
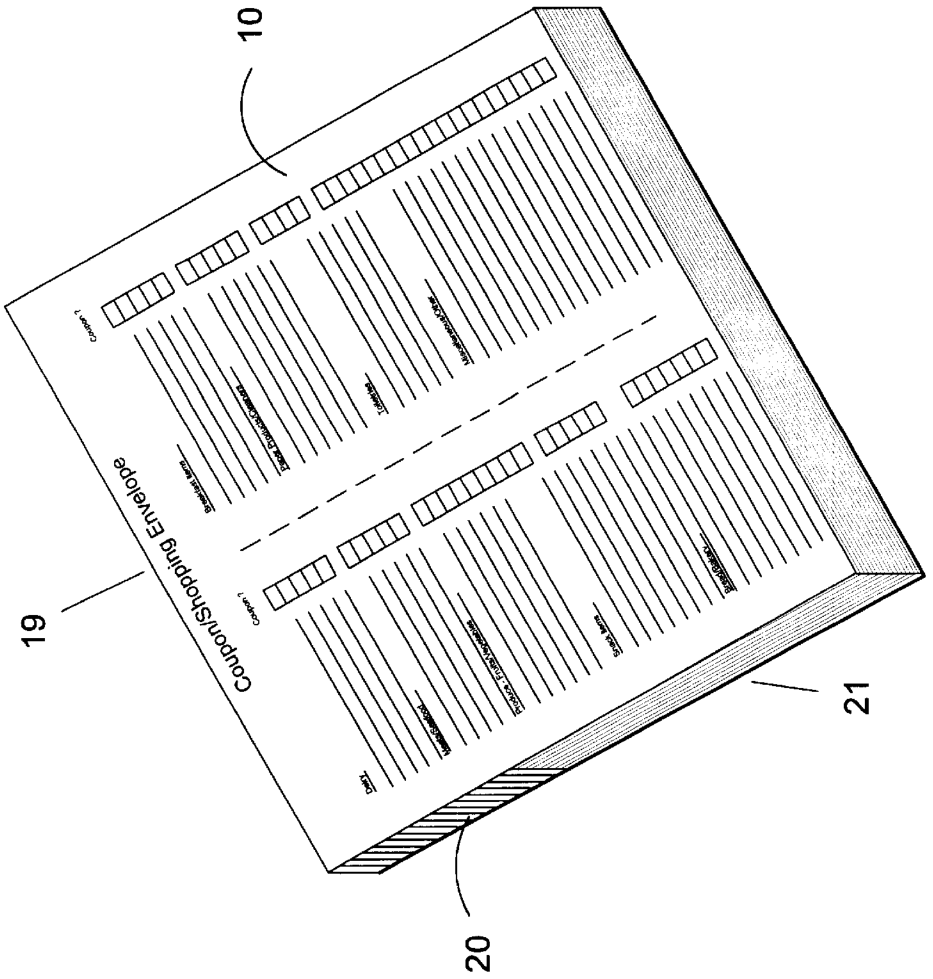
FIG. 5 is a perspective view illustrating a plurality of shopping list sheets bound together into a pad, from which individual shopping list sheets are peeled upon completion of each shopping list.

FIG. 5 is a perspective view illustrating a plurality of shopping list sheets bound together into a pad 19. A binding 20, comprising glue, plastic, or any other suitable binding substance, is located along the upper portion of one edge of pad 19, and serves to bind the plurality of shopping list sheets 10 together. Binding 20 does not, however, bind shopping list sheets 10 together permanently. Instead, when a shopping list is completed, the individual shopping list sheet 10 is peeled from pad 19 and converted into integrated shopping list and coupon folder 16. It can be appreciated that the adhesive on tacky strips 17, 18*a*, and 18*b* is of a strength sufficient to hold the edges of integrated shopping list and coupon folder 16 together, but not so strong as to prevent individual shopping list sheets 10 from being separated from each other—i.e., peeled from pad 19. Further, the tacky adhesive is of the resealable, reusable type known in the art.

Figure 6:
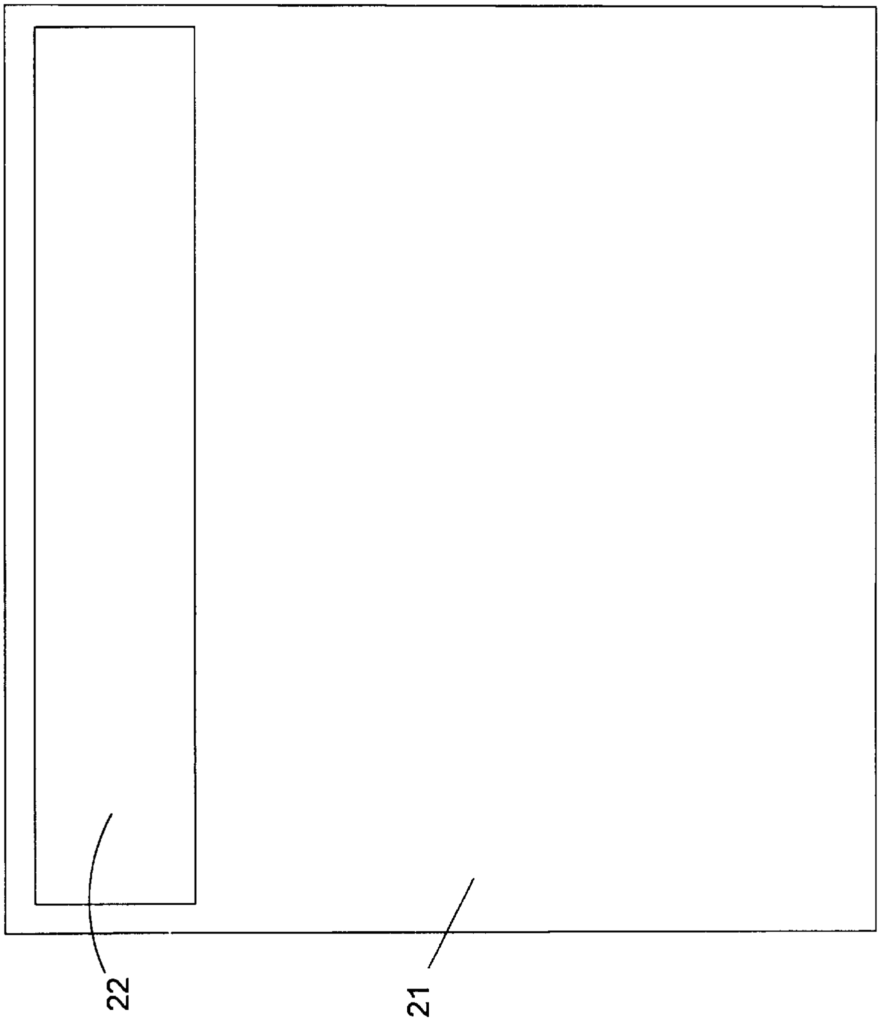
FIG. 6 is a back view of the pad shown in FIG. 5, illustrating the magnetic strip across the back top surface of the pad.

Pad 19 has a backing sheet 21, comprised of cardboard, paper, plastic, or other suitable material and located at the back surface of pad 19, below the stack of shopping list sheets 10. As shown in FIG. 6, pad 19 also has a magnetic strip 22 located on the back surface of backing sheet 21, in order that pad 19 can be releasably attached to a magnetically attractable surface such as a refrigerator door or metal cabinet.

Conclusions, Ramifications, and Scope

Thus the reader will see that this invention provides a very useful shopping aid, comprised of an individual shopping list sheet that can be easily bound into a pad of such sheets and attached to a convenient surface. When the shopping list is complete, the shopping list sheet is simply peeled from the pad and converted into an integrated shopping list and coupon folder.

While the above descriptions contain many specificities, these shall not be construed as limitations on the scope of the invention, but rather as exemplifications of embodiments thereof. Many other variations are possible. Examples of just a few of the possible variations follow:

The shopping list can also be divided horizontally, and thus the fold line would extend transversely across the width dimension of the shopping list sheet. In this embodiment the tacky adhesive areas would be located differently than in the main embodiment—i.e., one tacky adhesive area would extend along a side edge of the back of the sheet, rather than along the bottom edge, and two tacky areas would extend partially across the top and bottom edges, rather than partially along the side edges.

The adhesive areas can be located differently—for example, one tacky adhesive area could be located across the top of the back of the sheet, rather than the bottom, and additional tacky areas could be located along the upper portions of the side edges, rather than the lower portions. This adhesive configuration could be used with a vertical fold line, and would eliminate the need for an additional binding. The sheets would simply be bound together by the tacky adhesive areas on the back of one sheet releasably adhering to the front of the next sheet in the pad.

The main embodiment comprises a bottom tacky strip that extends across the entire bottom of the back of the shopping list sheet, and two side tacky strips that seal against each other. Alternatively, however, the bottom tacky strip can extend across just half of the bottom of the shopping list sheet, and just one side tacky strip can be employed. In this alternative embodiment, each tacky area would not seal against another tacky area, but rather against plain paper. As long as the sealing strength against plain paper were sufficient, this would have the advantage of saving on adhesive costs. In addition, the side tacky strips can be eliminated, so that the completed coupon folder is sealed on two sides—along the fold line, and by the bottom tacky strip. Tacky strips can also be employed at both the bottom and top, without side tacky strips, such that the completed coupon folder is sealed on three sides—along the fold line, and at the top and bottom. Further, the side tacky strips can extend up the sides of the back of the shopping list sheet to a greater or lesser degree than shown in the main embodiment.

The adhesive used for the adhesive areas can alternatively be a wettable adhesive, rather than the tacky adhesive described in the main embodiment. In addition, the adhesive areas can be of the type that is covered with paper or plastic strips until use. The cover strips would be peeled off to expose the adhesive surface.

The magnetic element on the pad backing can be of a shape different than the strip shown in the main embodiment, or it can be located differently on the pad backing. Both the magnetic element and the pad backing are not absolutely necessary, and can be eliminated.

The fold line can be perforated or non-perforated.

Accordingly, the scope of the invention should be determined not by the embodiments illustrated, but by the appended claims and their legal equivalents.

What is claimed is:

1. An integrated shopping list and coupon folder, comprising:

(a) a substantially flat planar sheet having front and rear faces, a top edge, and a bottom edge, and two opposing side edges, and (b) said front face displaying a shopping list including a plurality of shopping item spaces configured for written insertion of selected shopping items, and (c) means for securing said bottom edge of said rear face directly to itself, such that an object cannot be inserted between the secured bottom edges without breaking the securement, and a means for securing at least a portion of said opposing side edges to each other, wherein said side edge securing means extends from the bottom edge securing means towards said top edge, in order to form said coupon folder open along said top edge, said bottom edge and opposing side edge, securing means being located on said rear face of said substantially flat planar sheet, whereby a shopping trip including coupon use is facilitated.

2. The integrated shopping list and coupon folder of claim 1, wherein said securing means comprises an adhesive disposed along said bottom edge of said rear face.

3. The integrated shopping list and coupon folder of claim 1, wherein said shopping list also includes a plurality of preprinted shopping item category indicia.

4. The integrated shopping list and coupon folder of claim 1, wherein said shopping list also includes coupon reminder means.

5. The integrated shopping list and coupon folder of claim 1, wherein a fold line is also located on said front face of said substantially flat planar sheet, extending from said top edge to said bottom edge.

6. The integrated shopping list and coupon folder of claim 1, wherein a plurality of said substantially flat planar sheets are attached together to form a pad.

7. The integrated shopping list and coupon folder of claim 2, wherein said adhesive is tacky and resealable.

8. The integrated shopping list and coupon folder of claim 4, wherein said coupon reminder means comprise a plurality of check boxes.

9. The integrated shopping list and coupon folder of claim 6, wherein said pad also includes a backing sheet attached to a back surface of said pad.

10. The integrated shopping list and coupon folder of claim 6, wherein a magnetic element is located on a back surface of said pad.

11. The integrated shopping list and coupon folder of claim 6, wherein said substantially flat planar sheets are attached together by a binding located along a side edge of said substantially flat planar sheets.

12. The integrated shopping list and coupon folder of claim 9, wherein a magnetic element is located on said backing sheet.

13. A shopping list aid, comprising:

(a) a substantially flat planar sheet having front and rear faces, a top edge, a bottom edge, and two opposing side edges, and (b) said front face displaying a shopping list including a plurality of shopping item spaces configured for written insertion of selected shopping items, and (c) at least one area of tacky resealable adhesive located on said rear face of said substantially flat planar sheet, said adhesive securing said bottom edge of said rear face directly to itself, such that an object cannot be inserted between the secured bottom edges without breaking the securement, and a means for securing at least a portion of said opposing side edges to each other, wherein said side edge securing means extends from the bottom edge securing means towards said top edge, in order to form a pouch open along said top edge.

14. The shopping list aid of claim 13, wherein said shopping list also includes a plurality of preprinted shopping item category indicia.

15. The shopping list aid of claim 13, wherein said shopping list also includes coupon reminder means.

16. The shopping list aid of claim 13, wherein a fold line is also located on said front face of said substantially flat planar sheet, extending from a top edge to a bottom edge thereof.

17. The shopping list aid of claim 13, wherein a plurality of said substantially flat planar sheets are attached together to form a pad.

18. The shopping list aid of claim 15, wherein said coupon reminder means comprise a plurality of check boxes.

19. The shopping list aid of claim 17, wherein a magnetic element is located on a back surface of said pad.

20. A method of integrating a shopping list with a coupon folder, comprising:

(a) providing a planar sheet having front and rear faces, a top edge, and a bottom edge, and two opposing side edges, and (b) said front face displaying a shopping list including a plurality of shopping item spaces configured for written insertion of selected shopping items, and (c) folding said planar sheet substantially in half along a fold line extending from said top edge to said bottom edge of said planar sheet, and (d) securing said bottom edge of said rear face directly to itself, such that an object cannot be inserted between the secured bottom edges without breaking the securement, and a means for securing at least a portion of said opposing side edges to each other, wherein said side edge securing means extends from the bottom edge securing means towards said top edge, in order to form said coupon folder open along said top edge.

* * * * *